United States Patent [19]
Kwiatkowski et al.

[11] 3,839,287
[45] Oct. 1, 1974

[54] POLYARYLIMIDES

[75] Inventors: George T. Kwiatkowski, Greenbrook; George L. Brode, Somerville, both of N.J.

[73] Assignee: Union Carbide Corporation, New York, N.Y.

[22] Filed: May 21, 1973

[21] Appl. No.: 362,287

Related U.S. Application Data

[63] Continuation-in-part of Ser. No. 182,527, Sept. 21, 1971, abandoned.

[52] U.S. Cl. ............... 260/49, 117/124 E, 161/197, 260/30.2, 260/32.6 N, 260/32.8 N, 260/47 CZ, 260/78 UA, 260/326 R, 260/326 N
[51] Int. Cl. ............................................. C08g 20/32
[58] Field of Search. 260/47 CZ, 49, 78 UA, 326 R, 260/326 N

[56] References Cited
UNITED STATES PATENTS
3,753,946    8/1973   Holub et al. ................... 260/47 CZ

*Primary Examiner*—Lester L. Lee
*Attorney, Agent, or Firm*—Bernard Francis Crowe

[57] ABSTRACT

Arylimides have been prepared from oligomer diamines and polyamines containing halogenated phenylene, oxygen, alkylidene and/or sulfone moieties and maleic anhydride. The resultant arylimides, in the form of B-stage resins can be used for the preparation of glass cloth prepregs, molding materials and adhesives which can be thermally converted to the thermoset state.

18 Claims, No Drawings

POLYARYLIMIDES

This is a continuation-in-part of Ser. No. 182,527 filed Sept. 21, 1971 now abandoned.

BACKGROUND OF THE INVENTION

This invention pertains to novel aromatic diamines and polyamines and flame retardant, thermally stable arylimides prepared therefrom by a condensation with maleic anhydride followed by chemical conversion to the imidized form.

Prior art polyamide-imides and polyimides have been used in the fabrication of glass cloth laminates but their use is accompanies by several major problems related to the critical and extensive curing cycles and the high temperature/pressure processing conditions required. Complete impregnation of woven glass cloth is difficult to accomplish with such high temperature materials and voids in the cured laminate often result from entrapped air. Other drawbacks accompanying the use of prior art polyamideimides and imides include the necessity for a dehydration or imidization step during fabrication, the moisture sensitivity of these materials, the instability of varnish solutions of the polyamic-acid precursors, the necessity for employing special solvents during the impregnation stage, high mold pressures during consolidation of the laminates, and the like.

Prior art thermosetting maleimides have been deficient in lacking a high degree of thermal stability due to the presence of thermally and oxidatively unstable backbones. Furthermore prior art thermosetting maleimides have not been capable of curing to thermally stable systems having the highly desirable combination of high glass transition temperatures, i.e., > 200°C. and high modulus plateaus, i.e., above their Tg.

wherein D is at least one radical, selected from the group consisting of:

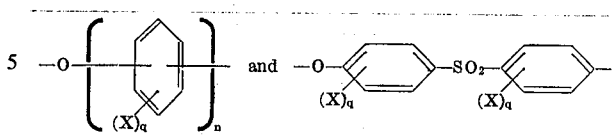

wherein Y is a radical having the formula:

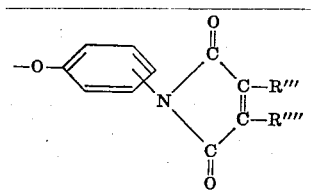

wherein each of R', R'', R''', and R'''' is a monovalent radical selected from the group consisting of H, lower alkyl having up to eight carbon atoms or Cl, r is an integer having values of 1 – 3,
  s is an integer having value of 0 to 3 with the proviso that when s is 0, Y is H or X,
  n is an integer having values of 1 to 5,
  k is an integer having values of 0 to 100,
  X is a halogen selected from the group consisting of F, Cl, or Br, and
  each of q and p are integers having values of 0 to 4.

The preparation of these arylimides may be best illustrated by the condensation of a diamine with maleic anhydride as shown below:

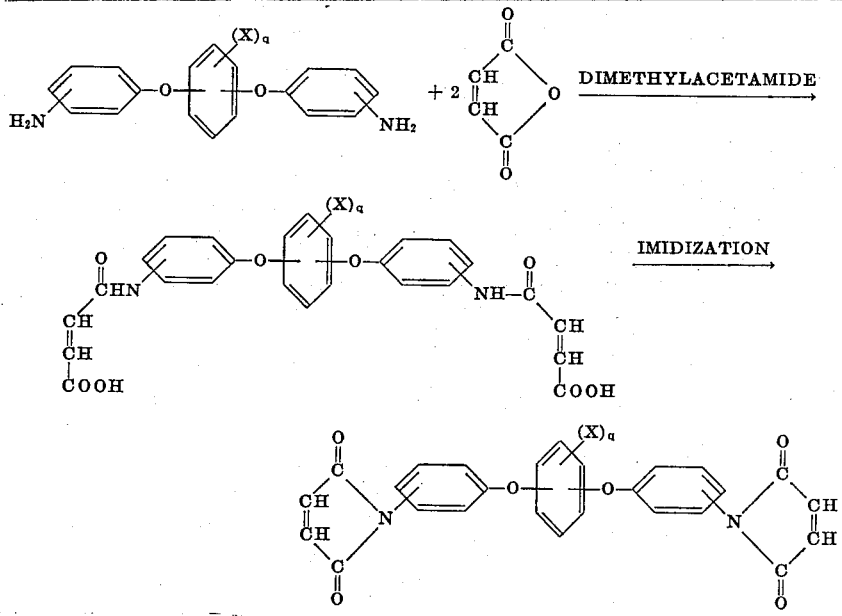

SUMMARY OF THE INVENTION

The above enumerated difficulties attendant with prior art polyamide-imides and polyimides can be precluded by the use of arylimides having the formula:

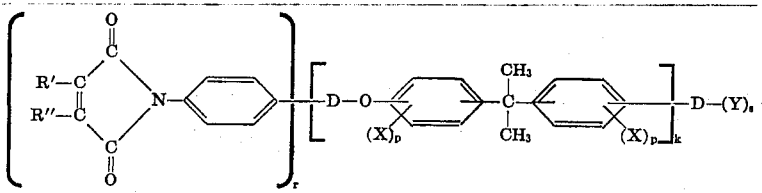

A more economical process for preparing arylimides involves synthesizing the arylimides in a solvent which allows direct in situ conversion to the corresponding maleimide.

In this case, the sequence of reactions is as follows:
1. formation of the sodium salt of P-aminophenol using sodium hydroxide in N-methylpyrrolodinone and in the presence of the chlorinated polyaromatic;
2. azeotropic distillation of the water formed followed by distillation of the azeotropic solvent;
3. completion of the condensation reaction at about 140°–170°C.;
4. addition of an equivalent amount of maleic anhydride to the reaction mixture at room temperature;
5. dehydrative imidization of the intermediate N-arylmaleamic acid by addition of acetic anhydride containing 10 percent sodium acetate;
6. recovery of the product by coagulation from water.

Preferred species represented by the generic arylimide formula shown above include the following:
1. Oligomer polysulfone bis(maleimides) having the formula:

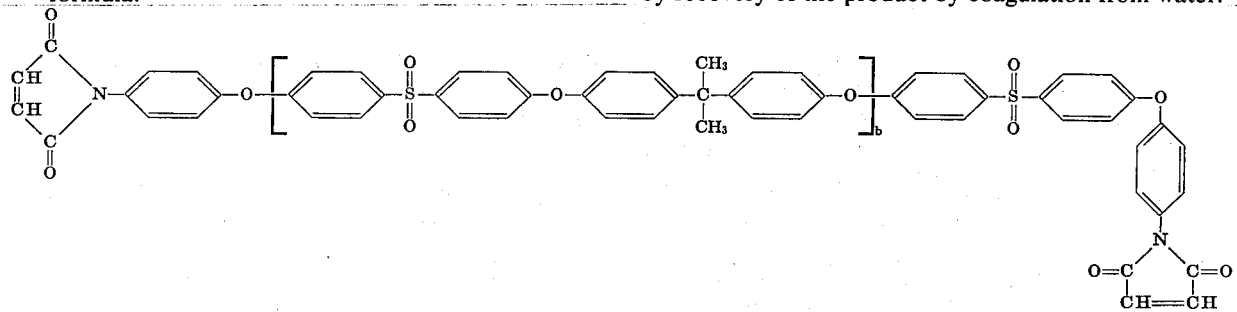

2. Oligomer polyphenylene ether maleimides having the idealized formula:

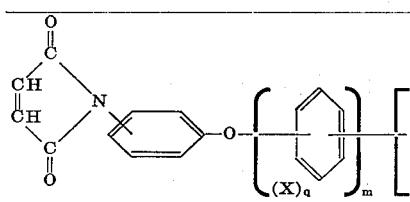

3. Polyphenylene ether maleimides having the idealized formula:

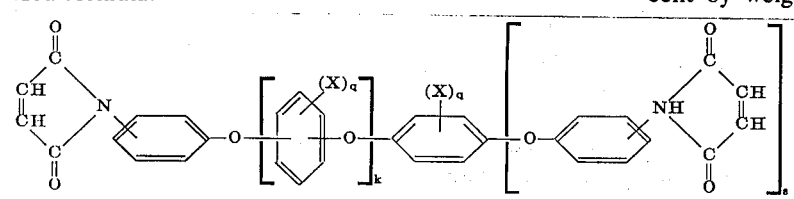

4. Arylether maleimides having the formula:

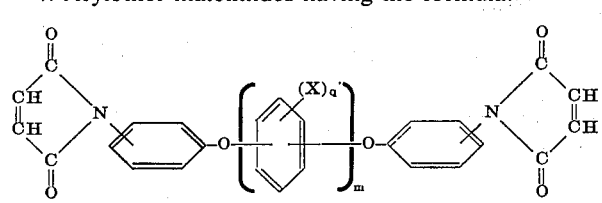

5. Oligomer arylether bisphenol A maleimide having the formula:

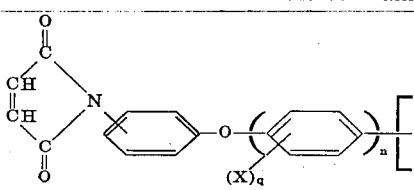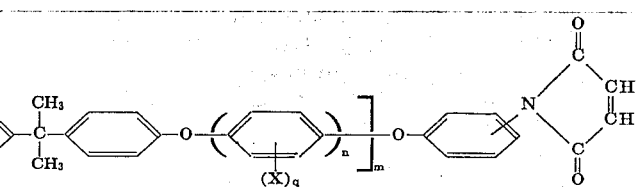

wherein b and s are integers having values of 0 to 3,
X is a halogen and preferably chlorine,
q is an integer having values of 0 to 4 and is preferably 4,
m is an integer having values of 1 to 4 and v is a rational number having values of 1 to about 2.

Especially preferred species of the oligomer polysulfone bis(maleimides) depicted in the Formula 1 above are those having molecular weights of about 600, 1,000, 1,500 and 2,500.

Preferred species of the oligomer polyphenylene ether maleimides of Formula 2 above are those where m is 3. Those maleimides represented by Formula 2 can be readily prepared by first preparing polyamines by condensation of the sodium salt of p-aminophenol with a halogenated, preferably chlorinated, polyphenyl in a highly polar solvent such as dimethylsulfoxide or dimethylformamide or N-methylpyrrolidinone followed by recovery of the product by coagulation from water.

The chlorinated polyphenyls thus obtained are a multicomponent mixture. For example, condensation of three moles of sodium p-aminophenolate with a 60 percent by weight chlorinated terphenyl (commercially available under the trade mark Aroclor 5460 from Monsanto Chemical Co.) afforded a product with a titrated amine equivalent weight of 281.

Three products were identified by mass spectrometry, viz., $C_{18}H_4Cl_7(OC_6H_4NH_2)_3$, $C_{18}H_5Cl_6(OC_6H_4NH_2)_3$ and $C_{18}H_4Cl_8(OC_6H_4NH_2)_2$. The first two of these products were triamines and the second a diamine. Other polychlorinated benzene reactants which can be used in this invention include hexachlorobenzene, 42 percent chlorinated biphenyl, (Aroclor 1242 trademark of Monsanto Chemical Co.) 54% chlorinated biphenyl -Aroclor 1254 trademark of Monsanto Chemical Co.), monochlorinated biphenyl (Aroclor 1221 trademark of Monsanto Chemical Co.) and the like. In the practice of this invention the condensation of sodium p-aminophenolate with halogenated hydrocarbon can be controlled to afford amines containing from one amine group to four amine groups. Any of these amines can then be converted to maleamic acids by condensation with maleic anhydride followed by cyclization to maleimide as described above for the polysulfone amines. Depending on the nature of the amine used one can obtain a series of maleimides containing from one to four imide functions per molecule. Those containing two to four imide functions per molecule are thermosetting resins. While maleimides containing only one imide function are not thermosetting alone they are when used in combination with the polyfunctional maleimides or other thermosetting systems.

Other useful halogenated benzenes which can be used in this invention include any of the bromo or fluoro derivatives of benzene, diphenyl, terphenyl, tetraphenyl, and the like.

In a similar manner of the oligomer polyphenylene ether bis(maleimides) shown by Formula 3 above can be obtained by condensing sodium p-aminophenolate with polyhalogenated diphenyl ethers. The resultant amines are then covered to the maleimides. Particularly preferred because of its commercial availability is decabromodiphenyl ether.

As another variation the oligomer polysulfone bis(-maleimides) shown in Formula 1 can be prepared with increased functionality over that of the normally difunctional amines disclosed therein by first preparing polyfunctional amines by condensing sodium paraaminophenolate, the disodium salt of bisphenol A (2,2-bis(p-hydroxyphenyl)propane), dichlorodiphenyl sulfone and hexachlorobenzene as shown in the equation below:

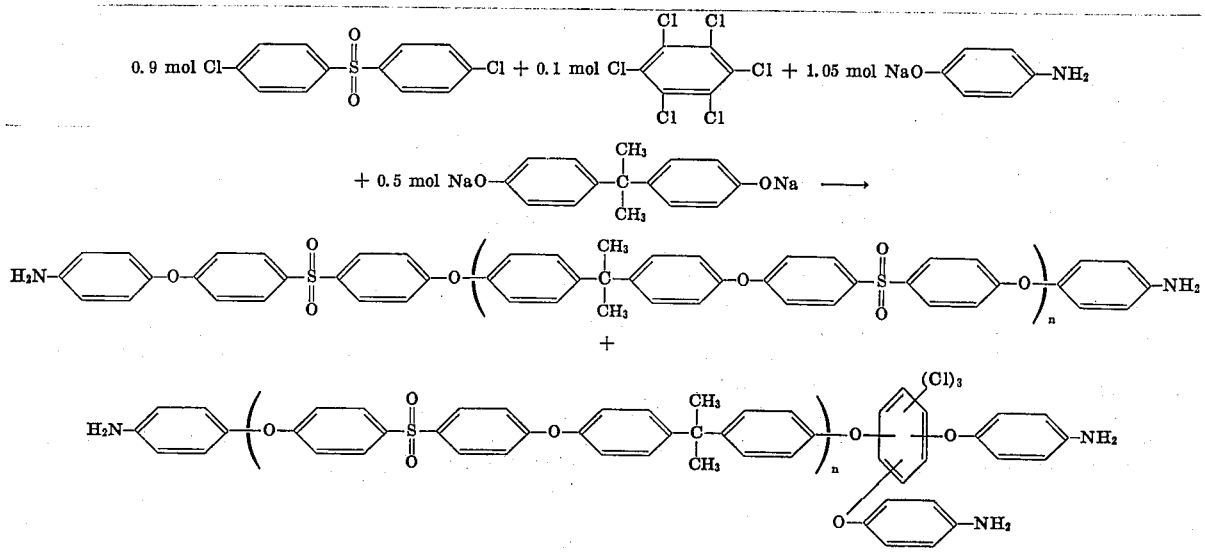

In this particular instance of titrated amine equivalent weight was 429.

Arylether maleimides represented by Formula 4 can be prepared as indicated by the following sequence of reactions:

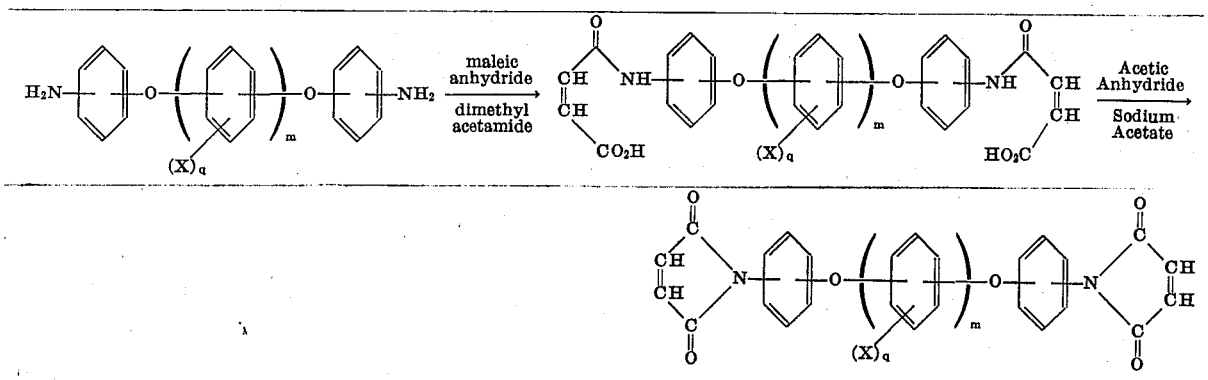

wherein m is an integer having values of 1 to 4.

Oligomer arylether bisphenol A maleimides represented by Formula 5 can be prepared by rene, 10%, 20; phenol-formaldehyde resin (Bakelite BRN-5238), 20%, >50; divinyl benzene, 5%, >50, furfuryl alcohol, 5%, 3.

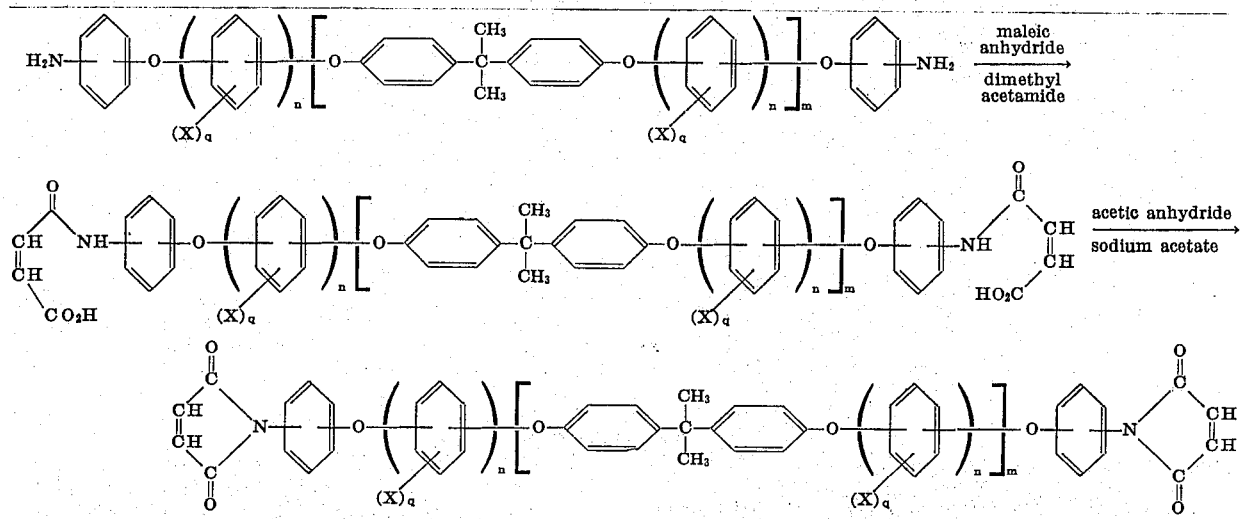

The above-described maleimides can be used as B-stageable resins for the preparation of glass cloth prepregs and adhesives which can be thermally converted to the thermoset state.

When the arylimides of this invention are heated to temperatures ranging from about 150°C. to about 300°C., the maleimide end groups become reactive with each other and addition polymerize to produce a crosslinked system. At low temperatures (180°-230°C.), the cure rate is slow and "B-staging" is possible. At 275°C., 20 minutes are required to effect complete cure.

The cure rates for the arylimides described in this invention can be markedly accelerated by the use of peroxides. For example, the cure rates for the following two arylamines were increased from over 1 hour at 200°C. for total cure (without peroxide) to under 5 minutes for total cure at 200°C. using 1.5% dicumyl peroxide as an additive.

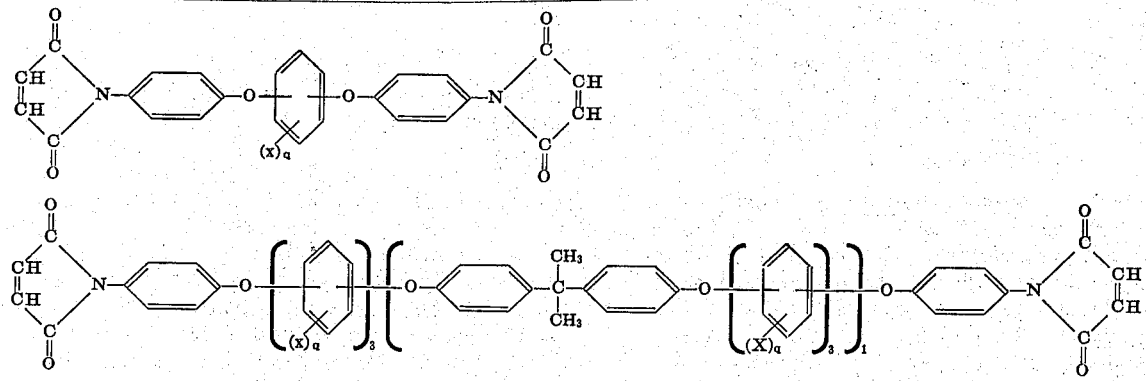

Other peroxide initiators which serve as effective cure accelerators include: benzoyl peroxide, cumene hydroperoxide and di-tertiary butyl peroxide. Additives such as phenols, amines and vinyl monomers are also useful cure accelerators for the arylimides, although the rate increase using these materials is less dramatic than with peroxide initiators. The following compounds, with additive level and approximate rate increase are illustrative: methylene dianiline, 10%, 2; phenol, 10%, 3; sty- The invention is further described in the examples which follow. All parts and percentages are by weight unless otherwise specified.

EXAMPLE 1

An oligomer polysulfone diamine was first prepared as follows. Into a 12-liter flask was charged 716.5 grams (3.14 moles) of bisphenol A, 687.5 grams (6.38 moles) p-aminophenol, 4.2 liters of dimethylsulfoxide and 2.5 liters of toluene. After purging with nitrogen, 1,003.8 grams (12.62 moles) of a 50.2% solution of sodium hydroxide was added and the pot temperature brought to 110°-120°C. Water was removed from the toluene azeotrope using a Barrett tube, after which the toluene was distilled off until the pot temperature reached 160°C. At this point, the reaction mixture was cooled to 110°C. and 1,807.5 grams (6.28 moles) of dichlorodiphenyl sulfone added as a solid. The pot was reheated to 160°C. for 1 hour and then cooled. At 150°C. a solution of sodium p-aminophenolate, prepared by dehydrating a mixture of 10.9 grams (0.1 mole) of para-aminophenol, 8.0 grams (0.1 mole) of a 50% sodium hydroxide solution, 30 ml. of dimethylsulfoxide and 20 ml. of toluene was added.

After cooling to room temperature the solution was filtered to remove sodium chloride and coagulated in a blender from 2% sodium hdroxide solution containing 1% sodium sulfite. The precipitated diamine was washed with a hot 1% solution of sodium sulfite and methanol and dried in a vacuum over at 80°C.

The yield of oligomer polysulfone diamine was 2,655 grams (96.5%) and the equivalent weight was 456 grams.

This oligomer diamine has the following formula shown below:

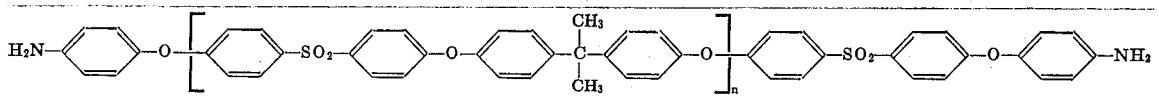

wherein n has an average value of about 1.

The bis(maleimide) was then prepared from the above prepared diamine as follows. To a 5-liter, 3-neck flask equipped with a stirrer, thermometer and nitrogen inlet tube was charged 900 grams (1.0 mole) of oligomer polysulfone diamine and 2 liters of dimethylacetamide. The diamine was allowed to dissolve and the solution then cooled to about 0°C. Maleic anhydride (196 grams, 2.0 moles) was added as a solid at such a rate as to keep the temperature below 15°C. After 1 hour at 10°–25°C., 204 grams (2.0 moles) of acetic anhydride and 20 grams (0.2 moles) of triethylamine was added in one portion and the mixture stirred for 4 hours.

The bis(maleimide) solution obtained thereby was coagulated from 10 parts of water to 1 part of reaction mixture and the tan powder which formed was collected by vacuum filtration. The product was repeatedly washed on the filter until the filtrate was neutral and then dried in a vacuum oven at about 85°C.

EXAMPLE 2

A prepreg was prepared by dissolving the oligomer polysulfone bis(maleimide) prepared in Example 1 in sufficient 50/50 methyl ethyl ketone/methyl isobutyl ketone to obtain a 60% solid solution. A 187 style 1528 glass cloth was dip coated in the solution and dried in an air flow oven at about 115°–150°C. for about 1 hour. The prepreg thus obtained were cut into 2 = 2 inch pieces for cure cycle studies.

4 to 6 Plies of the 2 × 2 prepreg were stacked between aluminum sheets and placed in a press at 200°C. and low contact pressure. The laminate was then heated to about 250°C. over a 10 minutes period. The press was opened momentarily (bumped) to release residual solvent. After a total of 20 minutes at 250°C. the press was cooled to room temperature and the laminate removed. The 2 × 2 laminates were light in color, difficult to delaminate and insoluble in dimethylacetamide thus demonstrating the formation of a crosslinked product.

Lap shear strength measurements were obtained with etched 1 × 6 × 20 mil alclad aluminum coupons (2024–T3) painted with the 60% solids solution described above on each surface to be bonded. The specimens were then air dried overnight and placed in a vacuum oven for 1 hour at 50°C. and 25 inches Hg vacuum. The coated compounds were then assembled by placing the coated surfaces together and warming on a hot plate. The assembled specimens were then cured for 1 hour at 575°F. and 100 psi. in a heated press. The assembled specimens were then tested according to ASTM-D1002 for tensile lap shear strengths at room temperature, 400°F. and 500°F. respectively. The results obtained are shown in Table I below.

TABLE I

| Temperature of Tensile Lap Shear Test | Tensile Strength, psi. |
|---|---|
| Room Temperature | 1850–1880 |
| 400°F. | 2000–2180 |
| 500°F. | 1330–1620 |

EXAMPLE 3

A polyphenylene ether amine was prepared as follows:

To a 2-liter, 4-neck flask equipped with a Dean Stark trap, condenser, nitrogen inlet tube and thermometer was added 110.0 grams (1.008 mole) p-aminophenol and 500 ml. of toluene. The system was purged with nitrogen and 400 ml. of dimethylsulfoxide added. The system was purged again with nitrogen and 81.5 grams (1.05 mole) of 49.15% aqueous sodium hydroxide added. The solution was heated to 110°–120°C. and water removed via the toluene/water azeotrope. After complete dehydration (approximately 4–5 hours), toluene was removed until the pot temperature reached 135°C.

A concentrated solution of Aroclor 5460 (274 grams) (0.5 mole) in 250 ml. of hot toluene was added via an additional funnel. The remaining toluene was then distilled off. The pot was heated to 160°C. to 165°C. and maintained 2 hours, before cooling to room temperature. At room temperature, the reaction mixture was vacuum filtered to remove sodium chloride and coagulated. Coagulation was accomplished by pouring the filtrate slowly into distilled water (1 to 10 of water) contained in a 3-liter blender and stirred at a high speed. Vacuum filtration through a fritted glass funnel afforded a dark colored amine. The amine was washed further with hot distilled water, then dried at 60°C. under vaccum.

The dried amine (76% yield) was dark brown in color and had a titrated amine equivalent of 365. The chlorine content by elemental analysis was 36.2%. The mass spectrum indicated the product was composed of 9 amines:

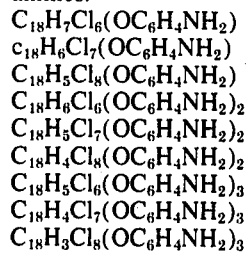

$C_{18}H_7Cl_6(OC_6H_4NH_2)$
$C_{18}H_6Cl_7(OC_6H_4NH_2)$
$C_{18}H_5Cl_8(OC_6H_4NH_2)$
$C_{18}H_6Cl_6(OC_6H_4NH_2)_2$
$C_{18}H_5Cl_7(OC_6H_4NH_2)_2$
$C_{18}H_4Cl_8(OC_6H_4NH_2)_2$
$C_{18}H_5Cl_6(OC_6H_4NH_2)_3$
$C_{18}H_4Cl_7(OC_6H_4NH_2)_3$
$C_{18}H_3Cl_8(OC_6H_4NH_2)_3$

EXAMPLE 4

To a 2-liter, 4-neck flask equipped with a Dean Stark trap, condenser, nitrogen inlet tube and thermometer was added 60.02 grams (0.55 mole) of p-aminophenol, 57.08 grams (0.25 mole) of bisphenol A and 500 ml. of toluene. The system was purged with nitrogen and 450 ml. of dimethylsulfoxide added. The system was purged again with nitrogen and 84.64 grams (1.04 mole) of 49.15% aqueous sodium hydroxide added. The solution was heated to 110°–120°C. and water removed via the toluene-water azeotrope. After complete dehydration (approximately 4–5 hours), toluene was removed until the pot temperature reached 135°C.

A concentrated solution of Aroclor 5460 (274 grams) (0.5 mole) in 250 ml. of hot toluene was added via an addition Funnel. The remaining toluene was then distilled off. The pot was heated to 160°–165°C. and maintained 2 hours, before cooling to room temperature.

At room temperature, the reaction mixture was vacuum filtered to remove sodium chloride and coagulated. Coagulation was accomplished by pouring the filtrate slowly into distilled water (1 to 10 of water) containing 2% sodium hydroxide and 1% sodium sulfite, contained in a 3 liter blender and stirred at a high speed. Vacuum filtration through a fritted glass funnel afforded a light colored diamine. The diamine was washed further with a hot 1% sodium sulfite solution and isopropanol, then dried at 85°C. under vacuum.

The dried diamine was tan in color and had a titrated amine equivalent of dichlorodiphenylsulfone

EXAMPLE 5

To a 2-liter, 4-neck flask equipped with a Dean Stark trap, condenser, nitrogen inlet tube and thermometer was added 121.1 grams (1.11 moles) p-aminophenol, 114.15 grams (0.5 mole) bisphenol A, 400 ml. toluene and 500 ml. dimethylsulfoxide. The solution was saturated with nitrogen and 171.32 grams (2.105 moles) of 49.15% aqueous sodium hydroxide added. The pot temperature was increased to 110°–120°C. and water removed via the toluene/water azeotrope. After complete dehydration (approximately 4–5 hours), the remaining toluene was removed until the pot temperature reached 150°–160°C.

The heating was discontinued and the reaction cooled to 130°C. Solid dichlorodiphenysulfone (258.3 grams, 0.9 moles) was added, followed by hexachlorobenzene (28.5 grams, 0.1 mole). After completing the addition of hexachlorobenzene, the pot was heated to 160°–**°C. and maintained 1 hour before cooling to room temperature.

At room temperature, the reaction mixture was vacuum filtered to remove sodium chloride and coagulated. Coagulation was accomplished by pouring the filtrate slowly into distilled water (1 to 10 of water)contianing 2% sodium hydroxide/1% sodium sulfite contained in a 3-liter blender and stirred at a high speed. Vacuum filtration through a fritted glass funnel afforded a light colored diamine. The diamine was washed further with a hot 1% sodium sulfite solution and isopropanol, then dried at 85°C. under vacuum.

The dried diamine was tan in color and had a titrated amine equivalent of 429.

EXAMPLE 6

To a 3-liter, 3-neck flask equipped with a nitrogen inlet tube, stirrer and thermometer was charged 1.36 equivalents of Aroclor 5460 diamine (NH$_2$ Equiv. = 367) prepared as in Example 3 and 1.5 liters of dimethylacetamide.

Solution was effected under nitrogen while cooling to 0°C. Maleic anhydride (1.37 m) was added while maintaining a temperature of about 15°C. The solution was then stirred for approximately 1 hour at 15°–25°C., after which acetic anhydride (1.39 m) and sodium acetate (1.3 m) were added. Stirring was continued for 4–5 hours at room temperature.

The arylimide was isolated from solution via coagulation in 10 parts of water. The tan powdery filter cake was water washed until neutral and then vacuum dried at 85°C. to a constant weight. The yield was 600 grams. This product had a molecular weight of about 850 uncured. After curing by heating at 270°C. for 30 minutes, this product showed a Tg of 245°C., a tensile modulus of 500,000 psi and a tensile modulus plateau above the Tg of 180,000–300,000 psi.

EXAMPLE 7

To a 1-liter, 3-neck flask was charged 150 grams (0.108 mole) of oligomer Aroclor 5460 arylamine prepared in Example 4 (eq. wt. = 696) and 300 ml. of dry dimethylacetamide. The mixture was cooled to 0°C. while under nitrogen and 21.17 g. (0.216 mole) of maleic anhydride added. After stirring for 1 hour at 0°–25°C., 22.03 g (0.216 mole) of acetic anhydride amd 2.2 g sodium acetate was added. The mixture was stirred for an additional four hours and then coagulated from water. The product maleimide was collected by vacuum filtration, washed further with water and dried at 80°C. for 48 hours. The yield was 151 grams (91%). This product had a molecular weight of about 1,560 uncured. After curing by heating at 275°C. for about 30 minutes, this product showed a Tg of 227°C., a tensile modulus of 400,000 psi and a tensile modulus plateau above the Tg of 6,100 psi.

EXAMPLE 8

A single pot synthesis was conducted of an arylamine and arylimide consecutively in the same vessel and the same solvent as follows:

To a 5-liter, 4-neck flask fitted with a thermometer, stainless steel gas inlet tube, Barrett tube, condenser and stirrer was charged 228.28 g. (1.0 mole) of bisphenol A, 114,60 g (1.05 mole) of p-aminophenol, 822.0 g (1.50 mole) of Aroclor 5460, 1,350 ml. of N-methylpyrrolidinone and 1,800 ml. of xylene. The mixture was purged for 15 minutes with nitrogen and then heated to reflux. At reflux, 246.3 g (3.025 mole) of 49.15% sodium hydroxide solution was added dropwise over a 60–70 minute period. Water was removed azeotropically during the addition and the pot temperature maintained at 150°C. Dehydration was continued until no water was present in the distillate. At this point, xylene was distilled over to a pot temperature of 170°C.

At room temperature, 103.0 g (1.05 mole) of maleic anhydride was added to the pot. One hour later, 107.2 g (1.05 mole) of acetic anhydride and 41 g (0.5 mole) of sodium acetate was added and stirring continued 4 hours further, before isolation.

Recovery was accomplished by coagulation from 10 parts water and vacuum filtration. The resin was slurried in water, filtered and dried in a vacuum oven for 48 hours. The coagulated powder was gold in color. The yield was 1,134 g (97.7%). This product had a molecular weight of 2,270 uncured. After curing by heating at 275°C. for about 30 minutes, this product showed a Tg of 200°C., a tensile modulus of 450,000 psi and a tensile modulus plateau above the Tg of 2,000 psi.

EXAMPLE 9

A 5-liter, 4-neck flask equipped with a condenser, thermometer, Barrett tube, addition funnel, nitrogen inlet tube and stirrer was charged with 225 g (2.063 mole) of p-aminophenol, 560.4 g (1.023 mole) of Aroclor 5,460, 1,200 ml. of xylene and 900 ml of N-methylpyrrolidinone. After purging with nitrogen, the mixture was brought to reflux (155°C.) and 167.55 g (2.058 mole) of 49.15% sodium hydroxide solution added dropwise over a 1 hour period. The water was removed azeotropically during the caustic addition. The xylene was recirculated until the dehydration was complete (1.5 hours) and the xylene then removed until the pot temperature reached 165°C.

After cooling to room temperature, 202.2 g (2.062 mole) of maleic anhydride was added. Stirring was continued for 1 hour and 213 g (2.10 mole) of acetic anhydride and 86.1 g (1.05 mole) of sodium acetate was charged. After stirring for four hours, the solution was coagulated from water and the product recovered by vacuum filtration. Water washing and drying at 80°C. for 48 hours afforded 835 grams (96%) of arylimide, m.p. 138°–142°C.

EXAMPLE 10

To a 3-liter, 3-neck flask equipped with a Barrett tube, condenser, nitrogen inlet tube and thermometer was added 115.0 grams (1.05 mole) of p-aminophenol, 114 grams (0.5 mole) of bisphenol A and 800 ml. of toluene. The system was purged with nitrogen and 800 ml. of dimethylsulfoxide added. The system was purged again with nitrogen and 164 grams (2.03 mole) of 49.15% aqueous sodium hydroxide added. The solution was heated to 105°–120°C. and water removed via the toluene/water azeotrope. After complete dehydration, toluene was removed until the pot temperature reached 135°C.

A concentrated solution of Aroclor 1268 (453 grams, 1.0 mole) in 500 ml. of hot toluene was added via an addition funnel. The remaining toluene was then distilled off. The pot was heated to 160°–175°C. and maintained 2 hours, before cooling to room temperature.

At room temperature, the reaction mixture was vacuum filtered to remove sodium chloride and coagulated. Coagulation was accomplished by pouring the filtrate slowly into agitated water (1/10 ratio) containing 2% sodium hydroxide/1% sodium sulfite. Filtration afforded a light colored diamine. The diamine was washed further with a hot 1% sodium sulfite solution, then dried at 85°C. under vacuum.

s dried diamine was tan in color and had a titrated amine equivalent of 650. The product melted in the range 125°–160°C.

EXAMPLE 11

To a 2-liter flask equipped with a nitrogen inlet tube, thermometer, drying tube and stirrer was charged 260 g (0.4 amine equivalents) of (n=1) oligomer Aroclor 1,286 arylamine prepared as in Example 10 (amine equivalent weight = 650) and 500 ml of dimethylacetamide. To the above stirred solution was then added 39.20 g (0.4 mole) of maleic anhydride. After stirring for 1 hour, 40.8 g (0.4 mole) of acetic anhydride and 32.8 g (0.4 mole) of sodium acetate was added. Four hours later, the product was recovered by coagulation.

The yield was 278.5 (95.3%). This product had a molecular weight of 1,370, uncured. After curing this product showed a Tg of 260°C., a tensile modulus of 450,000 psi and a tensile modulus plateau above the Tg of 60,000 psi.

A torsion pendulum apparatus was used for polymer characterization studies. The most important aspect of the torsion pendulum data involves the determination of secondary glass transitions. The determination of G', the real part of the complex shear modulus, has significance in that G' versus temperature resembles an E-T curve which is so commonly used for polymer characterization. G'', the imaginary part of the complex shear modulus, represents the viscous component of the shear modulus, therefore peaks for G'' versus temperature also correspond to transitions. A detailed explanation for determining the Tg, shear modulus, and shear modulus plateau is to be found in L. E. Nielson, Mechanical Properties of Polymers, Reinhold, N.Y. (1962).

High values for the tensile modulus plateau above the Tg, indicate high crosslinked density of the specimens.

Tensile modulus was calculated from shear modulus measurements.

EXAMPLE 12

An oligomer (n=2) polysulfone diamine was first prepared as follows. Into a 5-liter flask was charged 342.4 grams (1.5 moles) of bisphenol A, 165.33 grams (1.515 moles) p-aminophenol, 1.7 liters of dimethylsulfoxide and 1.1 liters of toluene. After purging with nitrogen, 368.16 grams (4.515 moles) of a 49.06% solution of sodium hydroxide was added and the pot temperature brought to 110°–120°C. Water was removed from the toluene azeotrope using a Barrett tube, after which the toluene was distilled off until the pot temperature reached 150°C. At this point, the reaction mixture was cooled to 120°C and 646.5 grams (2.25 moles) of dichlorodiphenyl sulfone added as a solid. The pot was heated to 160° C for 2 hours and then cooled.

At room temperature the solution was filtered to remove sodium chloride and coagulated in a blender from 2% sodium hydroxide solution containing 1% sodium sulfite. The precipitated diamine was washed with a hot 1% solution of sodium sulfite and methanol and dried in a vacuum oven at 80°C.

The equivalent weight of the oligomer polysulfone diamine was 710 grams.

The bis(maleimide) was then prepared from the above prepared diamine as follows. To a 0.5-liter, 3-neck flask equipped with a stirrer, thermometer and nitrogen inlet tube was charged 71 grams (0.1 equivalent) of oligomer polysulfone diamine and 200 ml of dimethylacetamide. The diamine was allowed to dissolve and the solution then cooled to about 0°C. Maleic anhydride (9.8 grams, 0.1 mole) was added as a solid at such a rate as to keep the temperature below 15°C. After 1 hour at 10°–25°C, 10.4 grams (0.1 mole) of acetic anhydride and 1.0 grams of triethylamine was added in one portion and the mixture stirred for 4 hours.

Recovery was accomplished by coagulation from 10 parts water and vacuum filtration. The resin was slurried in water, filtered and dried in a vacuum oven for 48 hours. The coagulated powder was tan in color. The yield was 99.8 grams. After curing by heating at 275°C for about 30 minutes, this product showed a Tg of 180°C, a tensile modulus of 400,000 psi and a tensile modulus plateau above the Tg of 1,500 psi.

EXAMPLE 13

An oligomer (n=4) polysulfone diamine was first prepared as follows. Into a 5-liter flask was charged 365.4 grams (1.6 moles) of bisphenol A, 88.25 grams (0.808 moles) p-aminophenol, 1.7 liters of dimethylsulfoxide and 1.2 liters of toluene. After purging with nitrogen, 326.8 grams (4.004 moles) of a 49.06% solution of sodium hydroxide was added and the pot temperature brought to 110°–120°C. Water was removed from the toluene azeotrope using a Barrett tube, after which the toluene was distilled off until the pot temperature reached 140°C. At this point, the reaction mixture was cooled to 120°c. and 574.3 grams (2.0 moles) of dichlorodiphenyl sulfone added as a solid. The pot was heated to 170°C for 1.5 hours and then cooled.

After cooling to room temperature the solution was filtered to remove sodium chloride and coagulated in a blender from 2% sodium hydroxide solution containing 1% sodium sulfite. The precipitated diamine was washed with a hot 1% solution of sodium sulfite and methanol and dried in a vacuum oven at 80°C.

The yield of oligomer polysulfone diamine was 765 grams and the equivalent weight was 980 grams.

The bis(maleimide) was then prepared from the above prepared diamine as follows. To a 500-ml, 3-neck flask equipped with a stirrer, thermometer and nitrogen inlet tube was charged 150 grams (0.8 mole) of oligomer polysulfone diamine and 250 ml of dimethylacetamide. The diamine was allowed to dissolve and the solution then cooled to about 0°C. Maleic anhydride (15.68 grams, 0.16 mole) was added as a solid at such a rate as to keep the temperature below 15°C. After one hour at 10°–25°C, 16.32 grams (0.16 mole) of acetic anhydride and 1.6 grams of triethylamine was added in one portion and the mixture stirred for 4 hours.

Recovery was accomplished by coagulation from 10 parts water and vacuum filtration. The resin was slurried in water, filtered and dried in a vacuum oven for 48 hours. The yield was 155.2 grams. The material exhibited a lap sheer tensile strength of 740 psi between aluminum.

EXAMPLE 14

A single pot synthesis was conducted in which the Arylamine and Arylimide were consecutively prepared in the same vessel and the same solvent.

A 5-liter, 4-neck flask equipped with a condenser, thermometer, Barrett tube, addition funnel, nitrogen inlet tube and stirrer was charged with 225 g (2.063 mole) of p-aminophenol, 560.4 g (1.023 mole) of Aroclor 5460, 1,200 ml. of xylene and 900 ml. of N-methylpyrrolidonone. After purging with nitrogen, the mixture was brought to reflux (155°C) and 167.55 g (2.058 mole) of 49.15% sodium hydroxide solution added dropwise over a 1 hour period. The water was removed azeotropically during the caustic additon. The xylene was recirculated until the dehydration was complete (1.5 hours) and the xylene then removed until the pot temperature reached 165°C.

After cooling to room temperature, 202.2 g (2.062 mole) of maleic anhydride was added. Stirring was continued for 1 hour and 213 g (2.10 mole) of acetic anhydride and 86.1 g (1.05 mole) of sodium acetate was charged. After stirring for 4 hours, the solution was coagulated from water and the product recovered by vacuum filtration. Water washing and drying at 80°C for 48 hours afforded 835 grams (96%) of Arylimide, m.p. 138°–142°C.

EXAMPLE 15

A chloroaryl ether triamine was first prepared as follows:

To a 2-liter, 4-neck flask equipped with a Dean Stark trap, condenser, nitrogen inlet tube and thermometer was added 300 grams (2.75 moles) p-aminophenol, 560 ml. of dimethyl sulfoxide, and 600 ml. of toluene. The system was purged with nitrogen and 221.79 grams (2.72 moles) of 49.05% aqueous sodium hydroxide added. The solution was heated to 106°–126°C and water removed via the toluene/water azeotrope. After complete dehydration (approximately 4–5 hours), toluene was removed until the pot temperature reached 135°C.

A concentrated solution of 499.5 g Aroclor 5460 (0.90 mole) in 500 ml. of hot toluene was added via an addition funnel. The remaining toluene was then distilled off. The pot was heated to 160°C and maintained 1 hour before cooling to room temperature.

At room temperature, the reaction mixture was vacuum filtered to remove sodium chloride and coagulated. Coagulation was accomplished by pouring the filtrate slowly into distilled water (1 to 10 of water) contained in a 3-liter blender and stirred at a high speed. Vacuum filtration through a fritted glass funnel afforded a light colored triamine. The triamine was washed further with hot distilled water, then dried at 60°C under vacuum.

The dried Aroclor 5460 amine (538 g) was brown in color and had a titrated amine equivalent of 282. This amine consisted primarily of triamines but also contained some tetra amines. The chlorine content by elemental analysis was 28.4%; the melting point was 120°–137°C.

To a 500 ml., three neck flask equipped with a nitrogen inlet tube, stirrer and thermometer was charged 40 g (0.178 equivalents) of Aroclor 5460 triamine ($NH_2$ Equiv. = 282), as prepared in the example above and 100 ml. of dimethylacetamide.

Solution was effected under nitrogen while cooling to 0°C. Maleic anhydride (22.05 g) was added while maintaining a temperature of about 25°C. The solution was then stirred for approximately 1 hour at 15°–25°C. after which 23 g of acetic anhydride (0.23 mole) and 3 g of sodium acetate were added. Stirring was continued for 4–5 hours at room temperature.

The arylimide was isolated from solution via coagulation in 10 parts of water. The tan powdery filter cake was water washed until neutral and then vacuum dried at 85°C to a constant weight. The yield was 43.4 g. This arylimide contained a preponderance of triimide functionality but also contained some tetraimide functionality.

EXAMPLE 16

A5460 arylimide with an average of 2.75 imide groups per molecule was prepared as follows:

A 5-liter, 4-neck flask equipped with a condenser, thermometer, Barrett tube, addition funnel, nitrogen inlet tube and stirrer was charged with 300 g (2.75 moles) of p-aminophenol, 548 g of Aroclor 5,460, 1,200 ml. of xylene and 1,000 ml. of N-methylpyrrolidinone After purging with nitrogen, the mixture was brought to reflux (160°C) and 219.7 g (2.7 moles) of 49.15% sodium hydroxide solution added dropwise over a 1 hour period. The water was removed azeotropically during the caustic addition. The xylene was recirculated until the dehydration was complete (1.5 hours) and the xylene then removed until the pot temperature reached 165°C.

After cooling to room temperature, 269 g (2.7 moles) of maleic anhydride was added. Stirring was continued for one hour and 285 g (2.80 moles) of acetic anhydride and 115 g (1.4 moles) of sodium acetate was charged. After stirring for 4 hours, the solution was coagulated from water and the product recovered by vacuum filtration. Water washing and drying at 85°C for 48 hours afforded an arylimide with approximately 2.75 imide groups/molecule.

The arylimide was cured by heating in a mold at 270°C/5 min. low pressure and then 30 minutes in a mold at medium pressure. The cured product exhibited a glass transition at 242°C with a room temperature sheer modulus of $1.3 \times 10^{10}$ dynes/cm$^2$ and a sheer modulus above the Tg of $6 \times 10^9$ dynes/cm$^2$.

EXAMPLE 17

A hexachlorobenzene ether amine monoimide was prepared as follows:

A 5-liter, 4-neck flask equipped with a condenser, thermometer, Barrett tube, addition funnel, nitrogen inlet tube and stirrer was charged with 132.26 g (1.2 moles) of p-aminophenol, 170.88 g (0.6 mole) of hexachlorobenzene, 390 ml. of xylene and 390 ml. of N-methylpyrrolidinone. After purging with nitrogen, the mixture was brought to reflux (155°C) and 96 g (1.2 moles) of 50% sodium hydroxide solution added dropwise over a 1 hour period. The water was removed azeotropically during the caustic addition. The xylene was recirculated until the dehydration was complete (1.5 hours) and the xylene then removed until the pot temperature reached 165°C.

After cooling to room temperature, 58.84 g (0.6 mole) of maleic anhydride was added. Stirring was continued for one hour and 61.25 g (0.6 mole) of acetic anhydride and 49.22 g (0.6 mole) of sodium acetate was charged. After stirring for 4 hours, the solution was coagulated from water and the product recovered by vacuum filtration. The product was washed with water and dried at 80°c for 48 hours affording an arylimide with an average of one imide function per molecule.

Although the invention has been described in its preferred form with a certain degree of particularity, it is understood that the present disclosure of the preferred forms has been made only by way of example and that numerous changes may be resorted to without departing from the spirit and scope of the invention.

What is claimed is:

1. A arylimide having the formula:

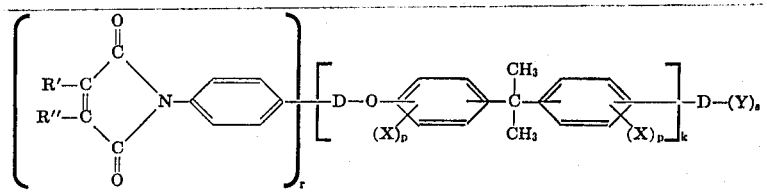

wherein D is at least one radical, selected from the group consisting of:

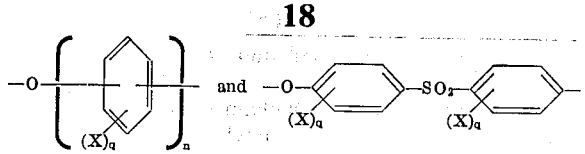

wherein Y is a radical having the formula

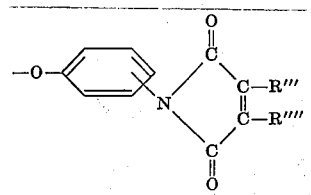

wherein each of R', R'', R''', and R'''' is a monovalent radical selected from the group consisting of H, lower alkyl having up to eight carbon atoms or Cl,
  r is an integer having values of 1–3,
  s is an integer having value of 0 to 3 with the proviso that when s is 0, Y is H or X,
  n is an integer having values of 1 to 5,
  k is an integer having values of 0 to 100,
  X is a halogen selected from the group consisting of F, Cl, or Br, and
  each of q and p are integers having values of 0 to 4.

2. Arylimide claimed in claim 1 wherein D is

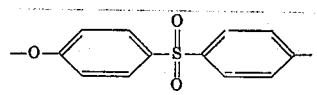

and k, r, and s are 1.

3. Arylimide claimed in claim 1 wherein D is

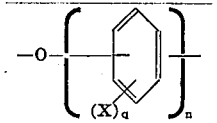

4. Arylimide claimed in claim 3 wherein X is Cl, n is 1, k is 0, s is 1 and q is 4.

5. Arylimide claimed in claim 3 wherein X is Cl, n is 2, k is 0, s is 1 and q is 4.

6. Arylimide claimed in claim 3 wherein X is Cl, n is 3, k is 0, s is 1 and q is 4.

7. Arylimide claimed in claim 1 wherein D is

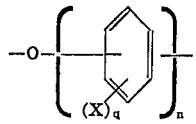

and k is 1.

8. Arylimide claimed in claim 7 wherein X is Cl, n is 1, s is 1 and q is 4.

9. Arylimide claimed in claim 1 wherein each of R', R'', R''' and R'''' is H.

10. Arylimide claimed in claim 1 wherein each of R′, R″, R‴ and R⁗ is Cl.

11. Arylimide claimed in claim 1 wherein each of R′, R″, R‴ and R⁗ is lower alkyl.

12. Arylimide claimed in claim 1 wherein D is

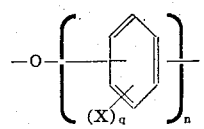

X is Cl, q is 2, s is 1 and k is 0.

13. Arylimide claimed in claim 1 wherein D is

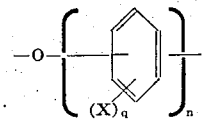

X is Cl, q is 3, s is 1 and k is 0.

14. Arylimide claimed in claim 1 wherein D is

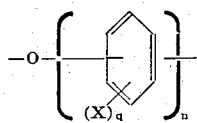

n is 1 and X is Cl.

15. Arylimide claimed in claim 1 wherein D is a mixture of

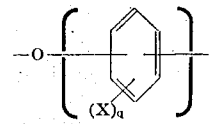

and

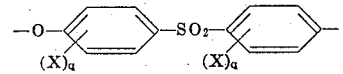

and X is Cl.

16. Arylimide claimed in claim 1 wherein n is 2, k is 1 and D is

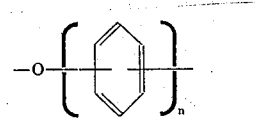

and X is Cl.

17. Arylimide claimed in claim 1 wherein D is

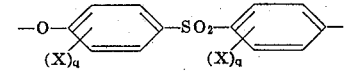

18. Arylimide claimed in claim 17 wherein k is 0.

* * * * *